(12) United States Patent
Villwock et al.

(10) Patent No.: US 7,029,162 B2
(45) Date of Patent: Apr. 18, 2006

(54) PROCESS AND APPARATUS FOR CONTINUOUS MIXING OF SLURRY WITH REMOVAL OF ENTRAINED BUBBLES

(75) Inventors: Robert Donald Villwock, Grass Valley, CA (US); Bryan Louis Martel, Nevada City, CA (US); Bruce Edward Welch, Elk Grove, CA (US); Joseph Richard Cochran, Grass Valley, CA (US)

(73) Assignee: Mobius Technologies, Inc., Grass Valley, CA (US)

( * ) Notice: Subject to any disclaimer, the term of this patent is extended or adjusted under 35 U.S.C. 154(b) by 100 days.

(21) Appl. No.: 10/412,608

(22) Filed: Apr. 10, 2003

(65) Prior Publication Data

US 2003/0227818 A1 Dec. 11, 2003

Related U.S. Application Data

(60) Provisional application No. 60/372,270, filed on Apr. 11, 2002.

(51) Int. Cl.
*B01F 15/02* (2006.01)

(52) U.S. Cl. ........................ 366/139; 366/184

(58) Field of Classification Search ................ 366/139, 366/184, 154.1, 155.1, 136, 137, 156.1, 165.1, 366/182.1; 95/261; 96/177, 196; 494/39, 494/61
See application file for complete search history.

(56) References Cited

U.S. PATENT DOCUMENTS

| | | | |
|---|---|---|---|
| 832,710 A | 10/1906 | Wade | |
| 1,560,826 A | 11/1925 | Kirschbraun | |
| 2,284,350 A | 5/1942 | Thwaits | 220/86 |
| 2,584,424 A | 2/1952 | Cornell | 260/417 |
| 2,932,318 A | 4/1960 | Ostberg | 137/592 |
| 3,058,622 A | 10/1962 | Ballestra | 222/77 |
| 3,229,449 A * | 1/1966 | Hogue | 96/196 |
| 6,039,470 A | 3/2000 | Conwell | 366/137 |
| 2002/0002208 A1 | 1/2002 | Martel et al. | 521/45.5 |

(Continued)

FOREIGN PATENT DOCUMENTS

WO WO 01/46304 A2 6/2001

OTHER PUBLICATIONS

H. Stone et al., "Recent Technical Advances in Recycling of Scrap Polyurethane Foam as Finely Ground Powder in Flexible Foam" *Proceedings of the Polyurethane Foam Association (PFA)*, 8 pages, May 2000.

(Continued)

*Primary Examiner*—Tony G. Soohoo
(74) *Attorney, Agent, or Firm*—Squire, Sanders & Dempsey L.L.P.

(57) ABSTRACT

The present system comprises an apparatus and a process for continuously dispersing fine particles in a liquid. The apparatus comprises a mixer that has at least one inlet for receiving the fine particles and liquid and an outlet. The mixer further comprises a barrel that has an inlet for accepting the fine particles and an outlet for dispersing the fine particles and a tank for holding the liquid. The tank has a top surface in which the barrel is disposed such that the outlet of the barrel is disposed under the surface of the liquid. An inlet of a vacuum centrifuge is coupled to the outlet of the mixer to receive a mixture of liquid and fine particles. A surge tank is coupled to an outlet of the vacuum centrifuge, wherein the mixture is dispersed from an outlet of the surge tank.

8 Claims, 6 Drawing Sheets

U.S. PATENT DOCUMENTS

| | | | |
|---|---|---|---|
| 3,437,276 A | 4/1969 | Gurley, Jr. et al. | 241/38 |
| 4,125,208 A * | 11/1978 | Bettermann | 366/139 |
| 4,230,630 A | 10/1980 | Mag et al. | 260/428 |
| 4,275,033 A | 6/1981 | Schulte et al. | 422/133 |
| 4,334,991 A | 6/1982 | Beede | 210/232 |
| 4,339,358 A | 7/1982 | Shuütz | 521/49.5 |
| 4,436,429 A | 3/1984 | Strong et al. | 366/2 |
| 4,439,042 A | 3/1984 | Bertoglio | 366/154 |
| 4,721,448 A | 1/1988 | Irish et al. | 425/144 |
| 4,759,632 A | 7/1988 | Horiuchi et al. | 366/2 |
| 4,810,098 A | 3/1989 | Kano et al. | 366/162 |
| 4,824,032 A | 4/1989 | Johansson | 241/46 B |
| 4,844,276 A | 7/1989 | Kunze et al. | 220/5 A |
| 4,859,072 A | 8/1989 | Fey et al. | 366/165 |
| 4,883,363 A | 11/1989 | Pillon et al. | 366/157 |
| 4,955,723 A | 9/1990 | Schneider | 366/136 |
| 5,044,761 A * | 9/1991 | Yuhki et al. | 366/139 |
| 5,101,849 A | 4/1992 | Richard | 137/15 |
| 5,152,943 A | 10/1992 | Sulzbach | 264/40.7 |
| 5,161,887 A * | 11/1992 | Goldberg et al. | 366/139 |
| 5,222,807 A | 6/1993 | Gaddis | 366/167 |
| 5,332,309 A | 7/1994 | Ramazzotti et al. | 366/88 |
| 5,451,376 A | 9/1995 | Proksa et al. | 422/131 |
| 5,478,147 A | 12/1995 | O'Brien et al. | 366/66 |
| 5,547,276 A | 8/1996 | Sulzbach et al. | 366/139 |
| 5,580,168 A | 12/1996 | Alireza et al. | 366/153.1 |
| 5,951,161 A | 9/1999 | Blagg | 366/152.6 |

OTHER PUBLICATIONS

R. Villwock, "Improved Comfort Factor with Recycled Content by Reformulation of Flexible Slabstock Foams", *Polyurethanes Expo 2001,* pp. 1-6, Oct. 2001.

J. Jensen, "Real-World Economics of Polyurethane Foam Recycling", *Proceedings of the Polyurethane Foam Association Technical Program,* Arlington, VA, 6 pages, May 18, 2000.

G. Oertel, et al., Chapter 3, Raw Materials, *Polyurethane Handbook,* Hansen Publishers 2$^{nd}$ Ed., pp. 55-72, 1993.

* cited by examiner

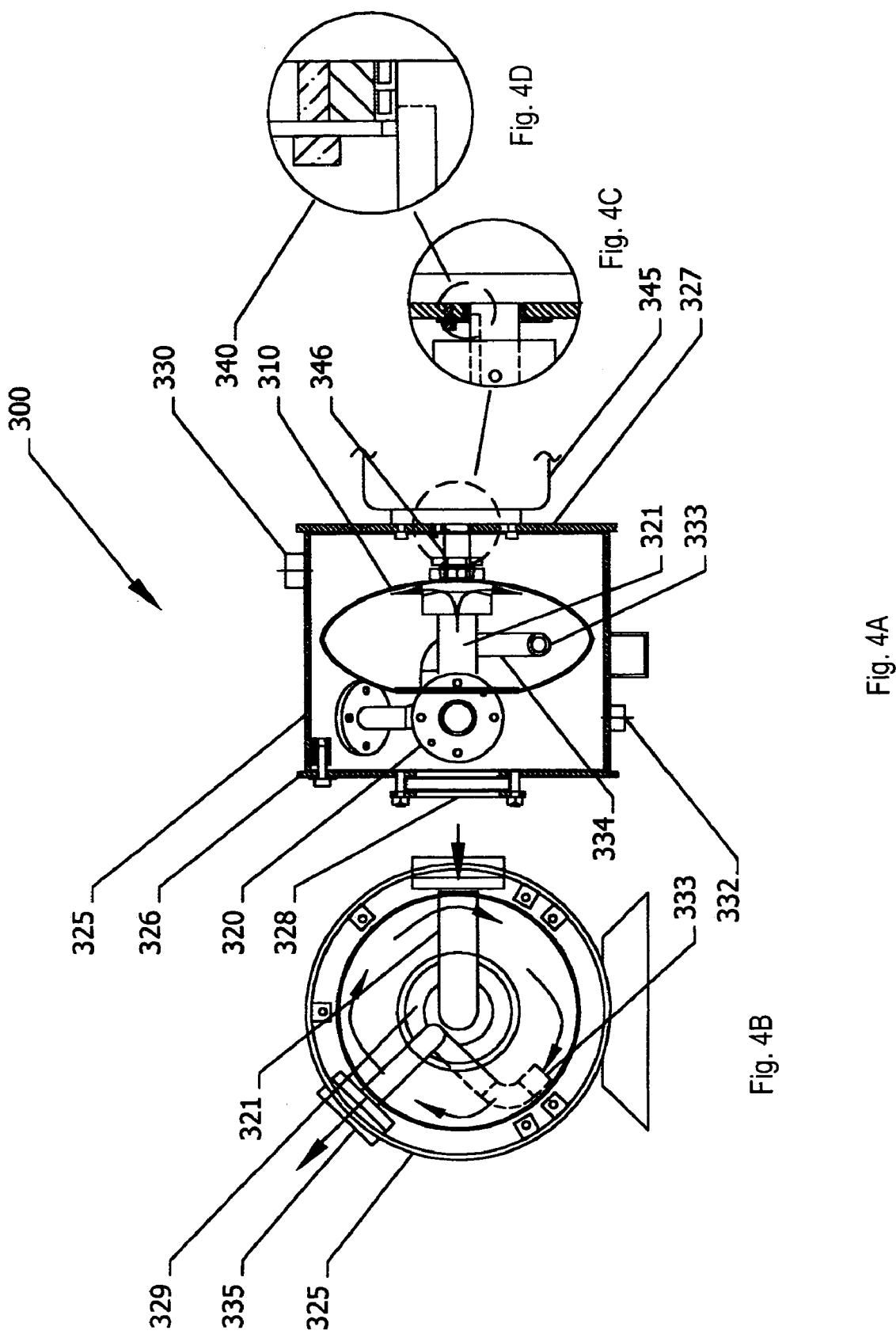

PROCESS AND APPARATUS FOR CONTINUOUS MIXING OF SLURRY WITH REMOVAL OF ENTRAINED BUBBLES

RELATED APPLICATIONS

This application claims the benefit of U.S. Provisional Application No. 60/372,270, filed Apr. 11, 2002.

BACKGROUND OF THE SYSTEM

1. Field of the System

This system relates to devices and processes for continuously preparing mixtures of powdered solids in liquids, further relates to processes for continuous removal of entrained bubbles from such mixtures. The system is particularly useful for the preparation of bubble-free slurries of finely ground polyurethane-foam particles in polyol, and for the preparation of new polyurethane articles that contain the finely ground polyurethane-foam particles.

2. Background

"Polyurethane" (PUR) describes a general class of polymers prepared by polyaddition polymerization of polyisocyanate molecules and one or more active-hydrogen compounds. "Active-hydrogen compounds" include water and polyfunctional hydroxyl-containing (or "polyhydroxyl") compounds such as diols, polyester polyols, and polyether polyols. Active-hydrogen compounds also include polyfunctional amino-group-containing compounds such as polyamines and diamines. A common example of an active-hydrogen compound is a polyether polyol such as a glycerin-initiated polymer of ethylene oxide or propylene oxide. Polyether polyols useful for slabstock flexible polyurethane foams generally have a molecular weight in the range of 2000 to 6000 g/mol, a functionality in the range of 2 to 7 (preferably about 3), and a viscosity at 25° C. generally in the range of 100 to 10,000 mPa-s.

"PUR foams" are formed via a reaction between one or more active-hydrogen compounds and a polyfunctional isocyanate component, resulting in urethane linkages. PUR foams are widely used in a variety of products and applications. These foams may be formed in a wide range of densities and may be flexible, semi-flexible, semi-rigid, or rigid foam structures. Generally speaking, "flexible foams" are those that recover their shape after deformation. In addition to being reversibly deformable, flexible foams tend to have limited resistance to applied load and tend to have mostly open cells. "Rigid foams" are those that generally retain the deformed shape without significant recovery after deformation. Rigid foams tend to have mostly closed cells. "Semi-rigid" or "semi-flexible" foams are those that can be deformed, but may recover their original shape slowly, perhaps incompletely.

A foam structure is formed by use of so-called "blowing agents." Blowing agents are introduced during foam formation through the volatilization of low-boiling liquids or through the formation of gas due to chemical reaction. For example, a reaction between water and isocyanate forms carbon dioxide ($CO_2$) gas bubbles in PUR foam. This reaction also generates heat and results in urea linkages in the polymer. Additionally, surfactants may be used to stabilize the polymer foam structure during polymerization. Catalysts are used to initiate the polymerization reactions forming the urethane linkages and to control the blowing reaction for forming gas. The balance of these two reactions, which is controlled by the types and amounts of catalysts, is also a function of the reaction temperature. A typical foam recipe includes at least one polyol, at least one isocyanate, and also typically includes water, surfactant, and catalysts, and also optionally includes additional blowing agent, fillers, and additives for color, fire performance, antimicrobial activity, etc.

Polyurethane foam can be ground into fine particles using, for example, cryogenic processes or roll mills (see for example, U.S. patent application Ser. No. 09/748,307 filed Dec. 21, 2000, incorporated herein by reference). These fine particles can then be used to replace chemicals in recipes for new foam; this provides an environmental benefit and often a cost savings.

In order to add polyurethane powder to the recipe, the powder must be mixed with liquid reactants. Further, the slurry must be free of entrained bubbles because they create an undesirable irregular cell structure in the foam, including holes and splits. Powder can be mixed with liquid reactants in a batch process by adding a known mass of powder to a known mass of polyol, mixing thoroughly, and allowing sufficient time (generally about 8 to 48 hours) for entrained bubbles to leave the slurry. Such a natural de-gassing process takes a long time because the slurry has a high viscosity, generally about 500 to 20,000 mPa-s. A continuous process for removal of entrained air is preferred over a batch process because the continuous process would not require waiting for entrained air to leave the slurry naturally, and the continuous processes would not require the large storage capacity necessary to hold the slurry needed for an entire day of foam production.

Methods are desirable for producing bubble-free slurries of fine particles of polyurethane in polyol, and for producing foam with these slurries. Fine particles useful in polyol slurries for producing foam include, but are not limited to, polyurethane, melamine, minerals, (e.g., calcium carbonate, barium sulfate, talc), carbon black, pigments, and other additives such as those that enhance fire performance. Particularly, a need exists for devices and processing methods to take finely ground polyurethane-foam particles, disperse them as a slurry in polyol, remove substantially all entrained bubbles from the slurry, and to use this slurry as a direct replacement for at least some of the chemicals in the production of new polyurethane articles. It is further desirable for such a process to be able to run continuously, such that powder and polyol are mixed, de-gassed, and used to make new polyurethane articles without delay. The desired continuous process must be able to deliver bubble-free slurry with an accurately controlled solids concentration at an accurately controlled flow rate.

SUMMARY OF THE SYSTEM

The present system comprises devices, methods and an integrated process for the continuous production of well-mixed, substantially bubble-free slurries of solid powders in liquids and for the delivery of such slurries at an accurately controlled concentration and flow rate. The devices comprise a mixer and a surge tank.

Powder and liquid (for example, finely ground polyurethane powder and polyol liquid) are delivered continuously to a mixer where they are contacted intimately and a slurry is produced. The slurry, which may contain entrained air bubbles, is delivered from the mixer to a de-gassing step, where entrained bubbles are continuously removed. Substantially bubble-free slurry is continuously delivered from said de-gassing step to downstream uses.

The mixer is designed to mix into a vessel of liquid (for example, polyol) a light, fluffy, low-bulk-density solid that has a tendency to float (for example, finely ground polyurethane foam). The mixer drives the solids onto or under the surface of the liquid in a tank using, for example, an auger, breaks up clumps of powder that otherwise tend to float rapidly because they hold interstitial air, and provides at least one mixing impeller to mix, disperse, and wet the powder. The mixer is integrated into a tank, which is optionally provided with internal baffles and an internal screen to retain any un-dispersed clumps of powder until they are fully wet out and dispersed. A slurry can be produced continuously with the mixer by delivering powder at a known, controlled rate to the mixer, delivering polyol at a known, controlled rate to the tank, and drawing the slurry away from the vessel.

The method for continuous removal of entrained bubbles from the slurry operates by means of a centrifuge operating in a vacuum environment. Slurry is delivered to the center of a bowl that is rotating with a high tangential velocity, for example about 10 to 100 m/s. The slurry spreads out thinly, rupturing any entrained bubbles. The entire rotating bowl is housed within a chamber in which the pressure is maintained at a vacuum. The rotating bowl throws the slurry along the wall of the bowl away from the center of the bowl. At some distance from the center of the bowl, the slurry is collected by a pickup tube. The energy imparted by the spinning bowl is sufficient to pump the de-gassed slurry out of the centrifuge, optionally through a one-way valve (check valve), into a surge tank.

The surge tank of the disclosed system provides a place for bubble-free slurry to accumulate without re-entrainment of bubbles. Bubble-free slurry can be continuously drawn from the bottom of the surge tank and continuously added from the centrifuge. The inlet connection where the bubble-free slurry flows into the surge tank has an internal weir that forces the slurry to flow down a surface such as the wall of the tank. This keeps the slurry from re-entraining bubbles upon start-up and also allows the slurry to be added to the top of the tank. Adding slurry to the top of the tank and removing it from the bottom is important because it is preferable to operate the tank on a first-in-first-out basis. Additional inlets with weirs can be provided to accommodate slurry recirculating from downstream processes such as from the mix head of a polyurethane foam machine.

The method disclosed comprises delivering powder and liquid to the mixer to produce a slurry, and subsequently continuously removing entrained bubbles from the slurry. Powder is delivered to the mixer at a known, controlled rate by means known to those skilled in the art. For example, a loss-in-weight feeder may be used. The mixer drives the powder under the surface of the slurry in the mix tank. Polyol is delivered to the mix tank at a known, controlled rate by means known to those skilled in the art. For example, a non-cavitating positive-displacement pump may be used. The mixer disperses and wets out the powder. Mixed slurry is continuously drawn from the bottom of the mix tank at a rate substantially equivalent to the total rate of addition of powder and polyol. The slurry is transferred to the vacuum centrifuge, where entrained bubbles are removed. The bubble-free slurry is pumped by the centrifuge to the disclosed surge tank, where it runs down the wall of the tank to avoid re-entraining any bubbles. Bubble-free slurry is drawn from the bottom of the surge tank at a rate substantially equivalent to the rate at which slurry is added to the surge tank. The slurry drawn from the bottom of the surge tank is immediately ready for use in polyurethane foam manufacture. It can be pumped from the surge tank, optionally through a heat exchanger or a mass-flow meter directly to the mix head of a foam machine.

A better understanding of the features and advantages of the present system will be obtained by reference to the following detailed description of the system and accompanying drawings which set forth an illustrative embodiment in which the principles of the system are utilized.

BRIEF DESCRIPTION OF THE DRAWINGS

FIGS. 4A, 4B, 4C and 4D show a simplified schematic diagram of a centrifuge within a vacuum chamber for removal of entrained air bubbles from a slurry.

DETAILED DESCRIPTION OF THE DRAWINGS

Those of ordinary skill in the art will realize that the following description of the present system is illustrative only and not in any way limiting. Other embodiments of the system will readily suggest themselves to such skilled persons.

Figure 1:
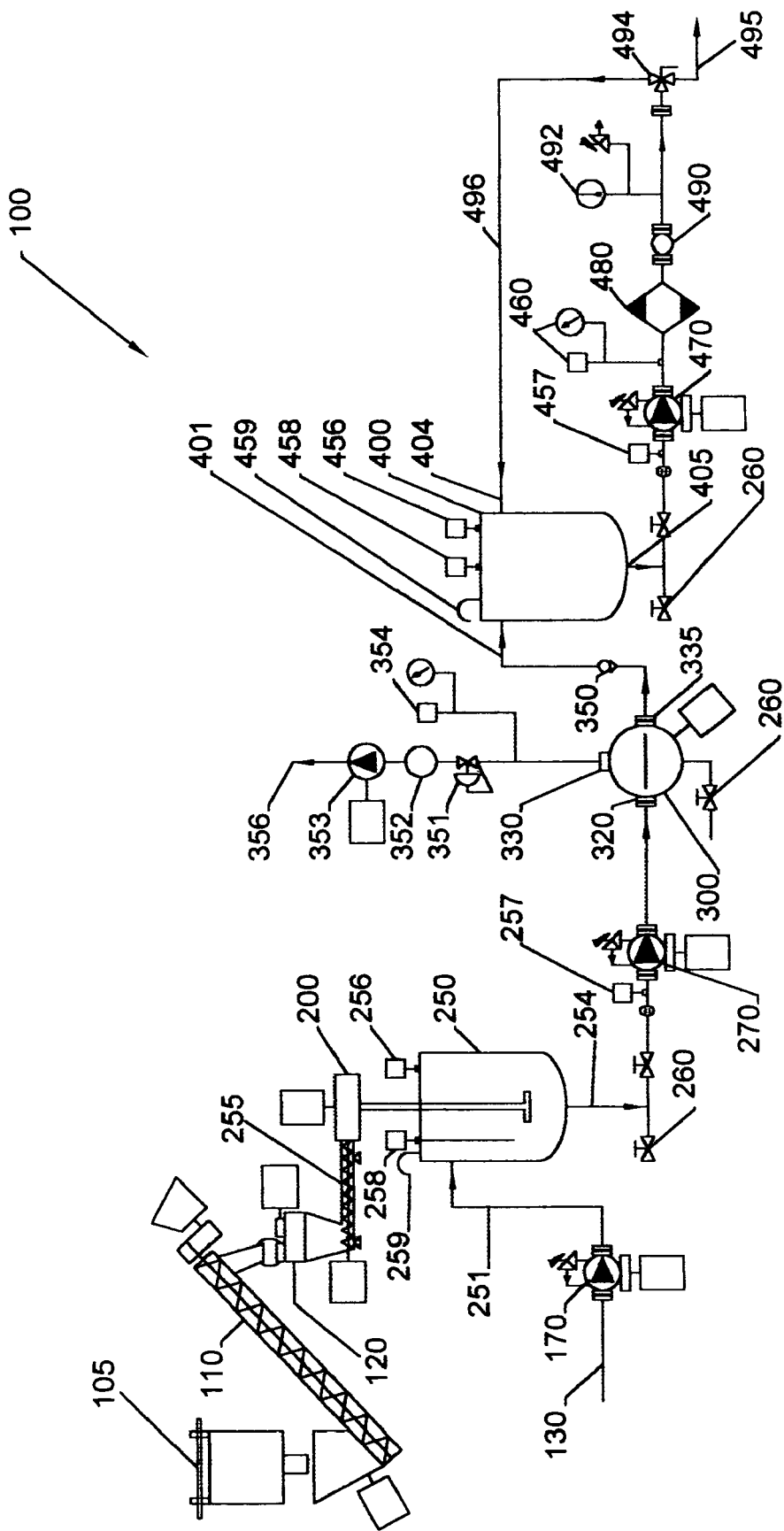
FIG. 1 is a process-flow diagram showing a process for the continuous production of substantially bubble-free slurry.

A schematic diagram of a process of the present disclosure 100 is shown in FIG. 1. Solid powder 105 (supplied for example in bulk bags) is conveyed by suitable means 110 (for example, a flexible screw conveyor) to the hopper of a powder feeder 120. For instance, the powder feeder may be a loss-in-weight belt or screw feeder. The powder feeder 120 delivers powder at a known and controlled rate to the mixer 200 (for example the disclosed mixer described in detail below) in tank 250. A liquid component (for example, polyol) is added to tank 250 through inlet 251. This liquid component is added at a known and controlled rate, for example by means of a non-cavitating positive-displacement pump 170, with a known and controlled speed of rotation, drawing from a tank (not shown) or other source of liquid 130. Alternatively, the rate of liquid addition can be measured with a flow meter. The ratio of powder addition rate to liquid addition rate to the mixer/tank is controlled to a predetermined value.

The mixer 200 in tank 250, as described in detail below, performs the function of thorough mixing of the powder into the liquid, with good dispersion and wet-out of the powder. The mixed slurry, which also generally contains entrained bubbles, exits tank 250 through a screen plate 253 and an outlet 254. Drain valves 260 are provided throughout the process for cleanup and shutdown. Tank 250 may have a vent 259, a continuous-level sensor 258, a high-level sensor 256, and a low-level sensor 257 for measurement and control (see FIG. 6) of the liquid level in the tank.

At mix-tank outlet 254, entrained bubbles may typically be present in the slurry at a concentration on the order of about 10% by volume. Mixed slurry is drawn from tank 250 through outlet 254 by any suitable means (gravity, pump, vacuum suction), for example a positive-displacement pump 270, and transferred to inlet 320 of vacuum centrifuge 300.

Vacuum centrifuge 300 continuously removes entrained bubbles from the slurry as described in connection with FIGS. 4A, 4B, 4C and 4D below. Vacuum is drawn from vacuum outlet 330 of vacuum centrifuge 300 to maintain within it a low absolute pressure, for example less than 1050 mbar, preferably between 1 and 300 mbar. Vacuum is drawn using suitable means, for example vacuum pump 353 with regulator 351, condensation trap 352, pressure measurement device 354, and exhaust to the atmosphere 356. Substantially bubble-free slurry exits the centrifuge 300 through outlet 335. Check valve 350 allows the slurry to pass to an inlet 401 of at least one surge tank 400 without backflow of slurry or air into the centrifuge.

Surge tank 400, or a plurality of such tanks, may be large enough to hold enough slurry for a full day of foam production. In such a case, the process is used to prepare a large batch of substantially bubble-free slurry. FIG. 1 depicts a process that is also suitable for producing slurry continuously and using that slurry for foam production without delay.

Surge tank 400, described in detail below, may have a vent 459, and continuous-level sensor 458, a high-level sensor 456, and a low-level sensor 457 for measurement and control (see FIG. 6) of the liquid level in the tank.

Substantially bubble-free slurry exits the surge tank through outlet 405, drawn by any suitable means (gravity, pump, vacuum suction), for example a non-cavitating positive-displacement pump 470. The mass flow rate is measured with meter 490, for example 490 may be an in-line coriolis-effect mass-flow meter. By means of three-way diverter valve 494, the slurry is transferred to downstream processes (for example, foam manufacture) via conduit 495, or recirculated to inlet 404 of surge tank 400 via conduit 496. The option for recirculation to the surge tank allows simple integration of the process to existing slabstock polyurethane-foam manufacturing plants. For instance, valve 494 may be located in close proximity to the mix head of a slabstock machine, mixing process 100 can be running prepared slurry via recirculation line 496, and substantially bubble-free slurry can be available to the foam-manufacture process immediately with a turn of valve 494. Similarly, valve 494 can be used to switch off downstream use of the slurry without interruption of mixing process 100. This effectively decouples the downstream foam-manufacture process from any startup or shutdown transients of mixing process 100.

Optionally, the prepared slurry may be heated or cooled using heat exchanger 480. The temperature and pressure of the slurry may be measured using meters 492 and 460 respectively.

Figures 2A, 2B:
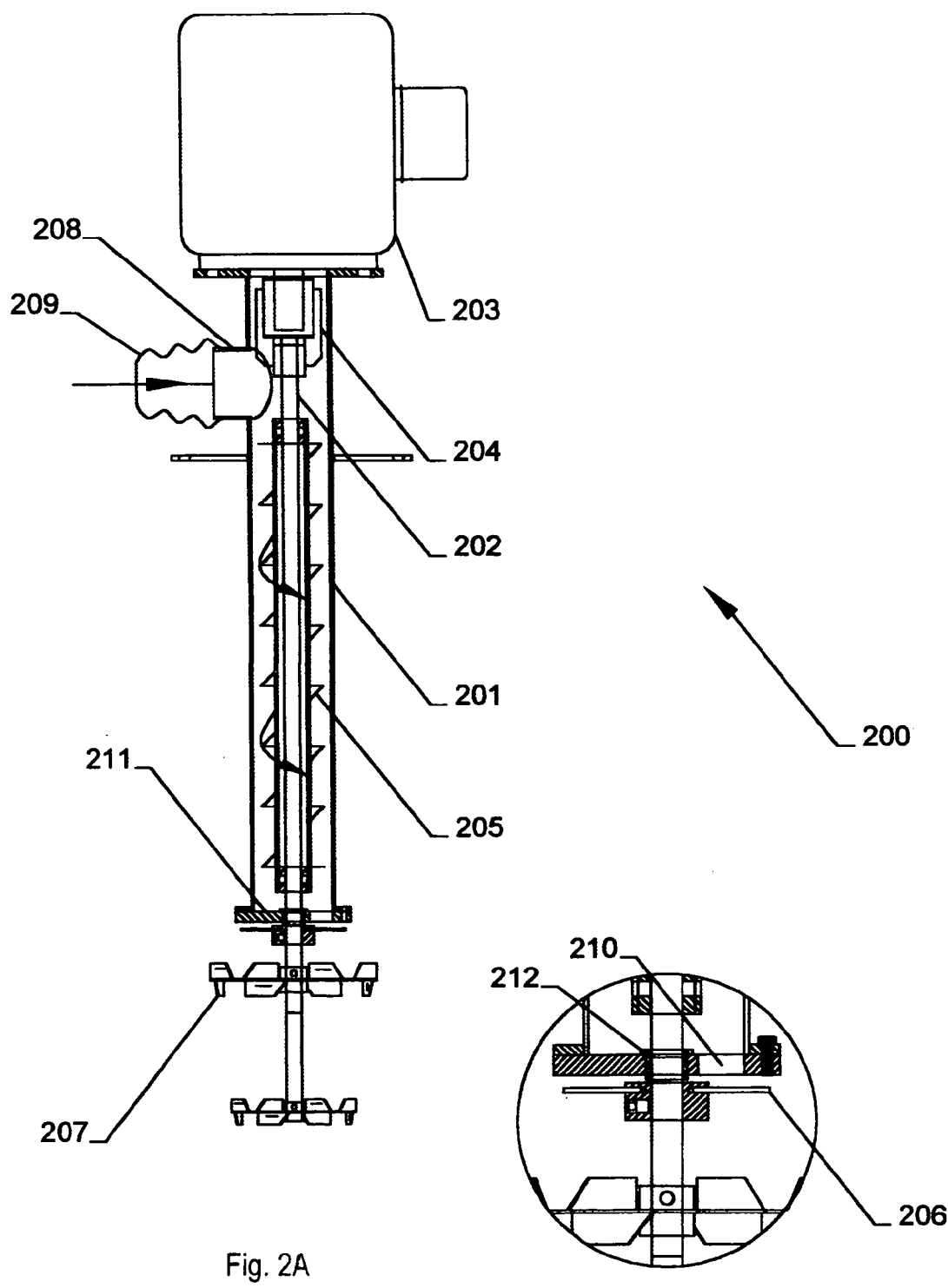
FIGS. 2A and 2B show a simplified schematic diagram of a mixer according to the present system.
Figure 3:
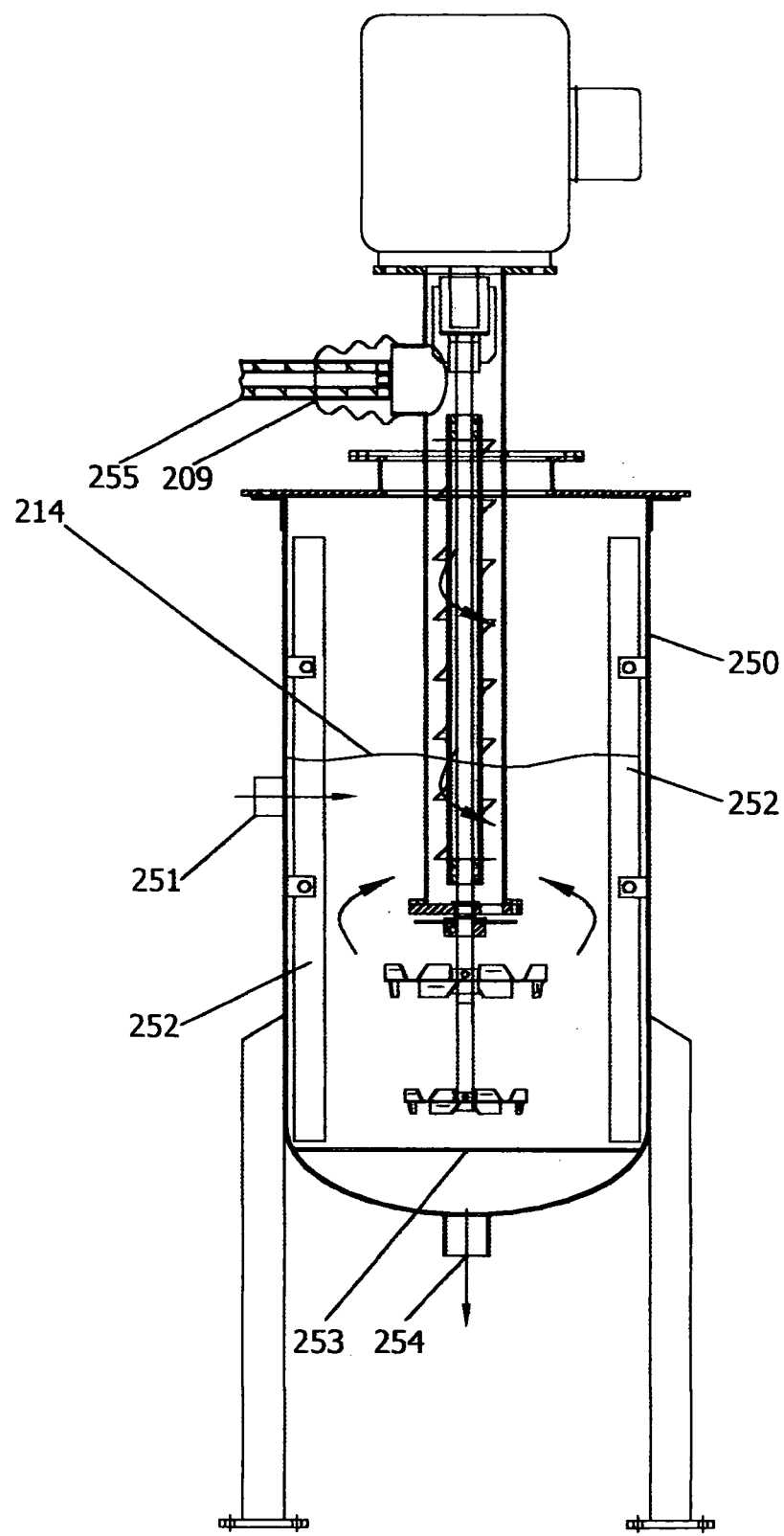
FIG. 3 is a simplified schematic diagram of the mixer of FIG. 2 integrated with a mix tank.

Referring now to FIGS. 2A, 2B and 3, the mixer assembly 200 comprises a barrel 201 within which a shaft 202 is rotated by a motor 203 through coupling 204. An auger 205, a lump-breaker 206, and at least one impeller 207 are attached to and rotate with shaft 202. Powder is added to the mixer at a known, controlled rate through port 208. A flexible boot 209 seals the port to the perimeter of powder feeder 255 in such a way as to avoid blowing dust while maintaining mechanical isolation of the mixer from powder feeder. If the powder feeder is a loss-in-weight feeder, mechanical isolation of the feeder from the mix tank is important so that the weight measurement is not biased. Powder drops through port 208 onto auger 205. The auger rapidly moves the powder through barrel 201 to the outlet 210. A bearing plate 211 is positioned at the outlet 210 of the barrel 201 and supports a bearing 212 for shaft 202. Bearing plate 211 has slots, apertures, or a spoke design in order simultaneously to support bearing 212 and allow the passage of material from barrel 201.

The outlet of the barrel 210 is positioned at or below the working liquid level 214 in the tank 250. Powder exits outlet 210 and is rapidly dispersed into the surrounding liquid by lump-breaker 206. The lump-breaker comprises an arrangement of stiff pins, for example a radial arrangement, affixed around a central hub. The pins are long enough to span the entire opening of outlet 210. The lump-breaker is positioned very close to the outlet so that no large lumps of powder may pass.

Impellers 207 are positioned at or below the lump-breaker and are of suitable size and design to provide multiple turnovers of the tank volume within the mean residence time of the powder. Preferably, at least one impeller is a radial-flow high-shear design. Axial-flow impellers (for example, marine impellers) provide higher flow and more tank turnovers. Preferably, one impeller is placed near the lump-breaker for good mixing, and a second impeller is placed near the bottom of the tank to avoid settling of solids.

The liquid component of the slurry (for example, polyol) is added to tank 250, preferably at a position near the working liquid level 214, by means of at least one inlet 251. The tank preferably has a plurality of baffles 252 to reduce the formation of a vortex. Near the bottom of the tank, a screen plate 253 is attached. The screen plate has a plurality of openings that allow mixed slurry to pass through, but that returns larger un-dispersed lumps of powder for additional mixing. Preferably the openings in the screen plate have a size of about 0.1 to 1 cm. Mixed slurry leaves the mix tank through an opening 254 in the bottom.

FIGS. 4A, 4B, 4C, 4D, 5A and 5B show schematic diagrams of a vacuum centrifuge 300 useful for removal of entrained bubbles from a liquid and a surge tank 400 useful for accumulating substantially bubble-free liquid without re-entrainment of bubbles. In the context of the vacuum centrifuge and surge tank, a "liquid" includes pumpable mixtures of solid particles in liquids, such as slurries of powders in liquids, or slurries of finely ground polyurethane powder in polyol.

Referring now to FIG. 4A, liquid to be de-gassed is delivered to inlet 320 of the centrifuge and travels through conduit 321 to bowl 310. Bowl 310 is attached to shaft 346 such that the bowl and shaft are rotated by suitable means, for example motor 345. When bowl 310 is rotated such that the tangential velocity is high (for example, between 10 and 100 m/s) the liquid spreads out thinly along the inside surface of the bowl, forcing bubbles to the surface under centripetal force and rupturing them. The liquid pools as far away from the axis of rotation as possible. A pickup tube 333 catches the liquid and directs it through conduit 334 to outlet 335. The rotation of the bowl imparts sufficient energy to the liquid to pump it through conduit 334.

A baffle 329, as shown in FIG. 4B, is affixed to conduit 321 and serves to keep liquid from splashing out of the bowl.

The spinning bowl 310 is disposed within a vacuum chamber 325, which has front plate 326 and back plate 327 attached with gaskets to make the chamber vacuum tight. Plate 327 contains a bearing-and-seal assembly 340 (details of which are shown in FIGS. 4C and 4D), through which shaft 346 rotates. Plate 326 optionally has a sealed sight glass 328 to allow viewing of the spinning bowl. Vacuum is applied to the chamber, for example through fitting 330. The low absolute pressure within the chamber (for example, 1 to 300 mbar) prevents bubbles from being re-entrained in the liquid as it is picked up (333) and directed toward outlet 335.

Substantially bubble-free liquid is available from outlet 335. A drain 332 may be provided to facilitate cleanup and shutdown.

Figures 5A, 5B:
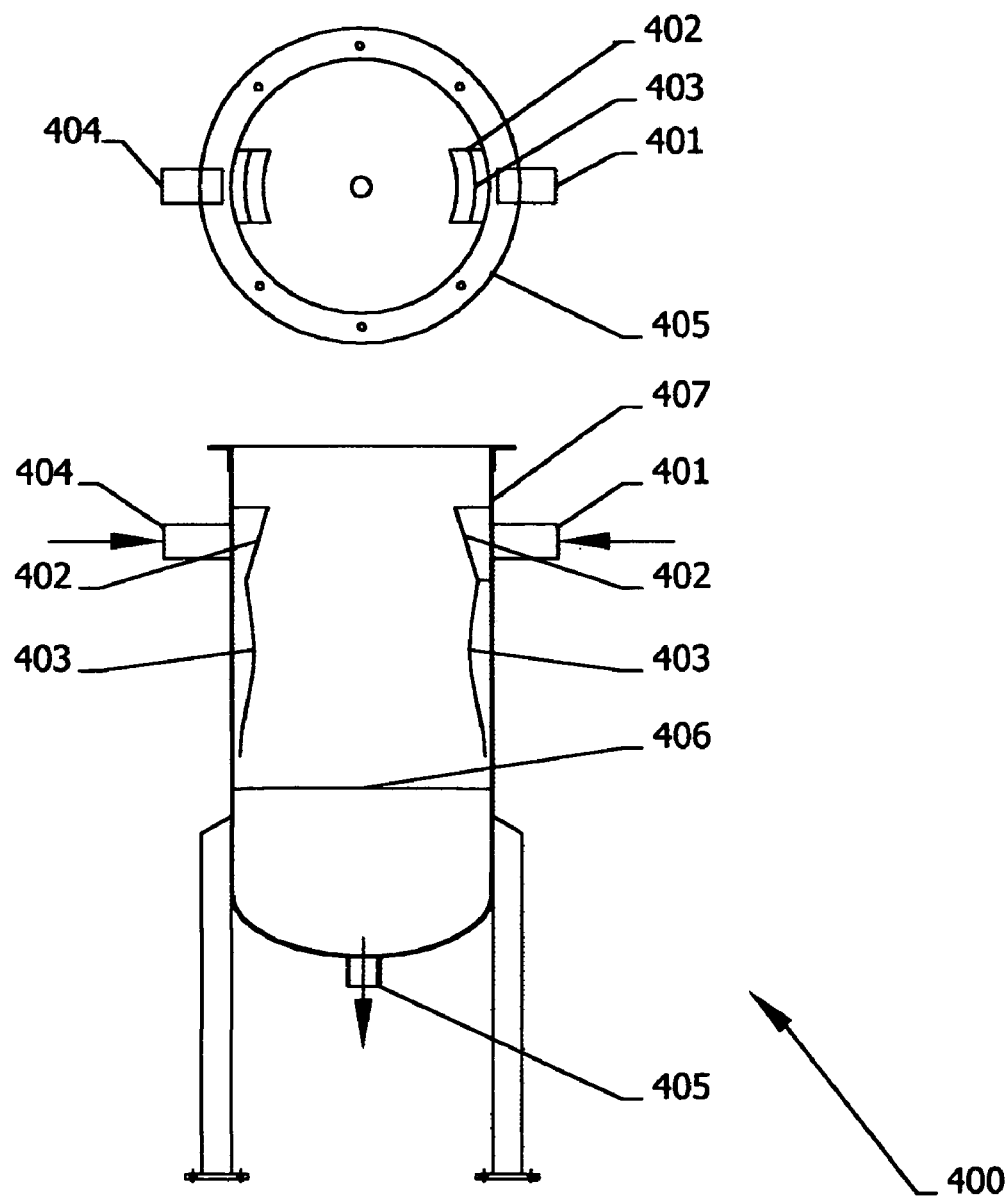
FIGS. 5A and 5B show a simplified schematic diagram of an embodiment surge tank of the present system.

Referring now to FIGS. 5A and 5B, a liquid is delivered to inlet 401. Inlet 401 is positioned near the top of the tank, while outlet 405 is at the bottom of the tank. This arrangement of inlet and outlet provides for desirable first-in-first-out operation of the tank, but presents the potential for entrainment of bubbles due to jetting or splashing of the liquid. Weir 402 prevents the liquid from jetting into the tank, rather the liquid is diverted such that it runs down the wall of tank 407. Flexible weir extension 403 keeps the liquid running down the wall of the tank even at low flow rates. Liquid runs between the extension 403 and the wall of tank 407, and sucks extension 403 against the wall. This avoids any liquid dripping, "raining", or otherwise falling through an air space between inlet 401 and free surface 406. Extension 403 may be made of flexible plastic sheet, for example.

FIG. 5A depicts the tank 407 as partially full, as it would be during startup from an initially empty condition. During initial filling, the liquid has the furthest distance to travel from inlet 401 to the free surface 406, and there is potential for entrainment of bubbles. Forcing the liquid to run down the side of the tank with weir 402 and extension 403 greatly reduces the potential for bubble entrainment.

Surge tank 400 may have a plurality of inlets 401, 404 with their associated weirs 402 and extensions 403. For example, inlet 401 may be used to receive liquid coming from outlet 335 of vacuum centrifuge 300, while inlet 404 may be used to receive liquid recirculating from outlet 405 through downstream processes.

EXAMPLE 1

A mass of 83.5 kg of VORANOL 3010A polyether polyol from Dow Chemical Co. was initially charged to a 30-gallon mix tank. To this tank was added 16.7 kg of a powder of finely ground polyurethane foam with a maximum particle size of 250 microns. The initial batch was mixed thoroughly using the mixer shown in FIG. 2A. The slurry obtained had a concentration of entrained air of about 10% by volume.

Using the process shown in FIG. 1, slurry was pumped from the mix tank, through the vacuum centrifuge and surge tank, and into a storage vessel. The concentration setpoint was 20 pphp (i.e., 20 parts of powder per 100 parts of liquid, or 16.7% by mass), and the flow rate setpoint was 20 kg/min of slurry. Samples of the slurry were taken as it left the process to go into the storage vessel. These samples were tested for slurry concentration by separating the powder from a known weight of slurry by means of filtering the powder from the slurry, washing away the polyol with methylene chloride solvent, drying and weighing the powder. These samples were also tested for entrained bubble volume by filling a 1000-mL graduated cylinder with slurry and observing the change in volume over a 24-hour period at constant temperature. Any volume change indicates the presence of entrained bubbles in the slurry product. For example, a 1-mL volume change would correspond to 0.1% entrained bubble concentration by volume.

The results shown in TABLE 1 were obtained, which show no entrained air bubbles in the product slurry, and powder concentrations that were accurately near the setpoint concentration of 20 pphp.

TABLE 1

| Sample ID | Time (Min:Sec) | Measured Powder Concentration (pphp) | Measured Volume % Of Bubbles In The Slurry |
|---|---|---|---|
| A | 2:30 | 19.9 | 0 |
| B | 2:45 | 20.2 | not measured |
| C | 3:00 | 20.1 | 0 |
| D | 3:15 | 19.8 | 0 |

Figure 6:
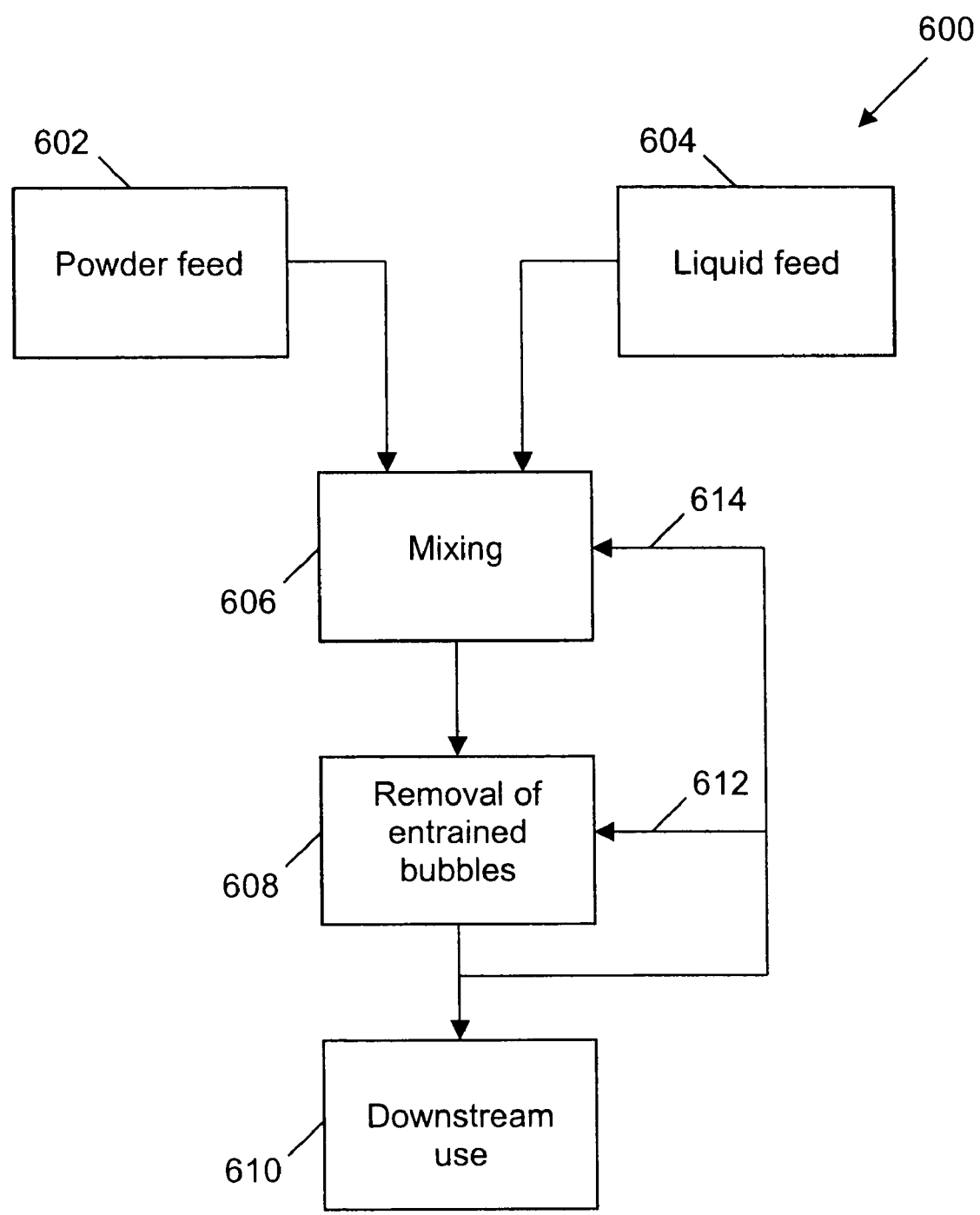
FIG. 6 is a flowchart illustrating an embodiment of a process for the continuous production of substantially bubble-free slurry.

A flow chart of a process of the present disclosure 600 is shown in FIG. 6. Powder 602 (for example, finely ground polyurethane powder) and liquid 604 (for example, polyol) are delivered continuously to a mixing step 606 (for example, using disclosed mixer 200) where the powder and liquid are contacted intimately and a slurry is produced. The slurry, which may contain entrained air bubbles, is delivered from the mixing step to a de-gassing step 608, where entrained bubbles are continuously removed. For example, the de-gassing step may use a vacuum centrifuge and may further use the disclosed surge tank described below. Next, substantially bubble-free slurry is continuously delivered to a downstream use 610. For example, downstream use 610 may be the production of polyurethane foam. Optionally, some or all of the slurry may be recycled back to the de-gassing step via 612 to the mixing step via 614.

It should be understood that various alternatives to the embodiments of the disclosed process and apparatus descried herein maybe employed in practicing the disclosed process and using the disclosed apparatus. It is intended that the following claims define the scope of the disclosed process and apparatus and that processes and structures within the scope of these claims and their equivalents be covered thereby.

What is claimed is:

1. An apparatus for continuously dispersing fine particles in a liquid comprising:
   a mixer having at least one inlet for receiving the fine particles and liquid;
   a vacuum centrifuge having an inlet coupled to an outlet of said mixer to receive a mixture of liquid and fine particles; and
   a surge tank having an inlet coupled to said outlet of said vacuum centrifuge, wherein said mixture is dispersed from an outlet of said surge tank and wherein said surge tank further comprises:
   a tank having a top and a bottom portion and having said inlet disposed on said top portion, said top portion having a flexible weir located around said top portion and in front of said inlet such that said mixture runs down the sides of the tank and out of said outlet located in said bottom portion of said tank.

2. The apparatus of claim 1 further comprising a pump coupled between said output of said mixer and said input of said vacuum centrifuge.

3. The apparatus of claim 1 further comprising an anti-backflow device coupled between said output of said vacuum centrifuge and said input of said surge tank.

4. The apparatus of claim 1 further comprising a means for transferring said mixture to further processes and recirculating said mixture to said inlet of said surge tank coupled to said outlet of said surge tank.

5. A method for continuously dispersing fine particles in a liquid comprising:
   providing a mixer having at least one inlet for receiving the fine particles and liquid;

coupling a vacuum centrifuge having an inlet and an outlet to an outlet of said mixer to receive a mixture of liquid and fine particles; and coupling a surge tank having an inlet to said outlet of said vacuum centrifuge, wherein said mixture is dispersed from an outlet of said surge tank and wherein said surge tank further comprises:

a tank having a top and a bottom portion and having said inlet disposed on said top portion, said top portion having a flexible weir located around said top portion and in front of said inlet such that said mixture runs down the sides of the tank and out of said outlet located in said bottom portion of said tank.

6. The method of claim 5 further comprising coupling a pump between said output of said mixer and said input of said vacuum centrifuge.

7. The method of claim 5 further comprising coupling an anti-backflow device between said output of said vacuum centrifuge and said input of said surge tank.

8. The method of claim 5 further comprising coupling to said surge tank a transferring means for transferring said mixture to a further process and a recirculating means to recirculate said mixture to said inlet of said surge tank.

* * * * *